(12) United States Patent
French

(10) Patent No.: US 11,518,293 B2
(45) Date of Patent: Dec. 6, 2022

(54) COMPOSITE BOAT TRAILER

(71) Applicant: Steve French Enterprises, LTD, LLC, Stuart, FL (US)

(72) Inventor: Stephen M. French, Stuart, FL (US)

(73) Assignee: Steve French Enterprises, LTD, LLC, Stuart, FL (US)

(*) Notice: Subject to any disclaimer, the term of this patent is extended or adjusted under 35 U.S.C. 154(b) by 309 days.

(21) Appl. No.: 16/944,389

(22) Filed: Jul. 31, 2020

(65) Prior Publication Data

US 2021/0031668 A1 Feb. 4, 2021

Related U.S. Application Data

(60) Provisional application No. 62/880,952, filed on Jul. 31, 2019.

(51) Int. Cl.
*B60P 3/10* (2006.01)
*B62D 21/20* (2006.01)
*B62D 29/04* (2006.01)

(52) U.S. Cl.
CPC .......... *B60P 3/1066* (2013.01); *B60P 3/1075* (2013.01); *B62D 21/20* (2013.01); *B62D 29/041* (2013.01)

(58) Field of Classification Search
CPC ...... B60P 3/1066; B60P 3/1075; B62D 21/20; B62D 29/041
See application file for complete search history.

(56) References Cited

U.S. PATENT DOCUMENTS

| 7,690,161 B2 | 4/2010 | McPherson | |
|---|---|---|---|
| 7,828,329 B2 | 11/2010 | Biscan | |
| 2010/0090452 A1* | 4/2010 | Verhaeghe | B62D 53/06 280/789 |
| 2013/0069417 A1* | 3/2013 | Wink | B60P 1/286 298/24 |
| 2018/0244321 A1* | 8/2018 | McCloud | B62D 29/043 |
| 2018/0264904 A1* | 9/2018 | McCloud | B62D 21/20 |
| 2021/0138951 A1* | 5/2021 | French | B62D 29/041 |

* cited by examiner

*Primary Examiner* — Jacob D Knutson
*Assistant Examiner* — Marlon A Arce
(74) *Attorney, Agent, or Firm* — McHale & Slavin, P.A.

(57) ABSTRACT

A composite boat trailer for use in saltwater. The beams, bolts, hangers, fenders, guide poles, suspension, and bunks of the trailer are formed from a composite material that cannot rust or corrode. The trailer employs a manufacturing technique that reinforces all beams to distribute forces anticipated during the movement of a boat on the trailer at highway speeds.

14 Claims, 9 Drawing Sheets

FIG. 4
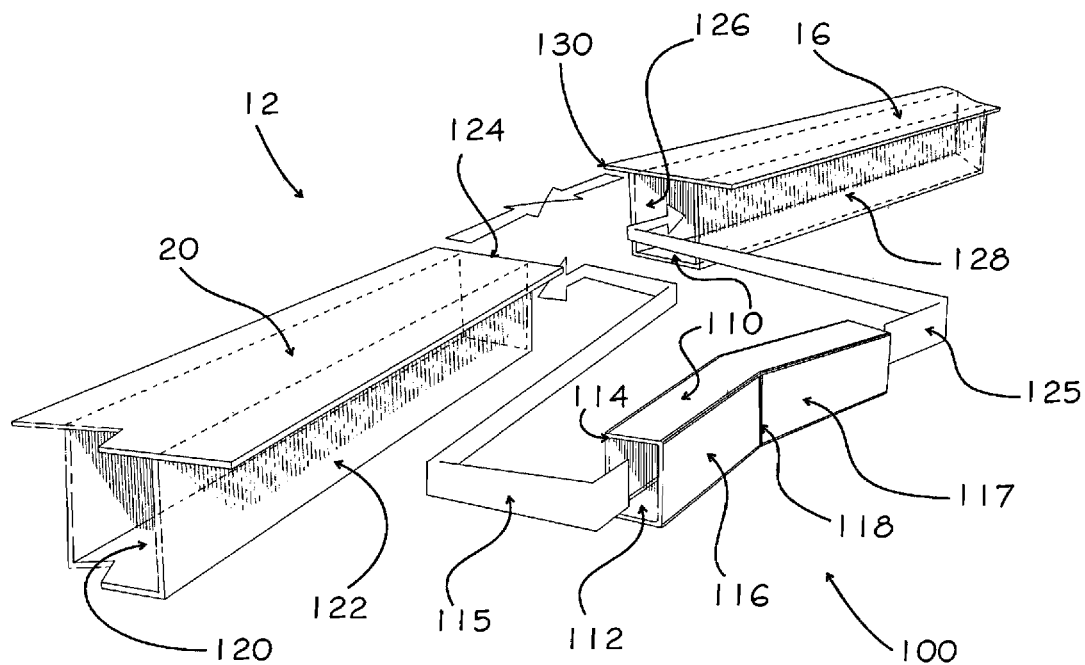
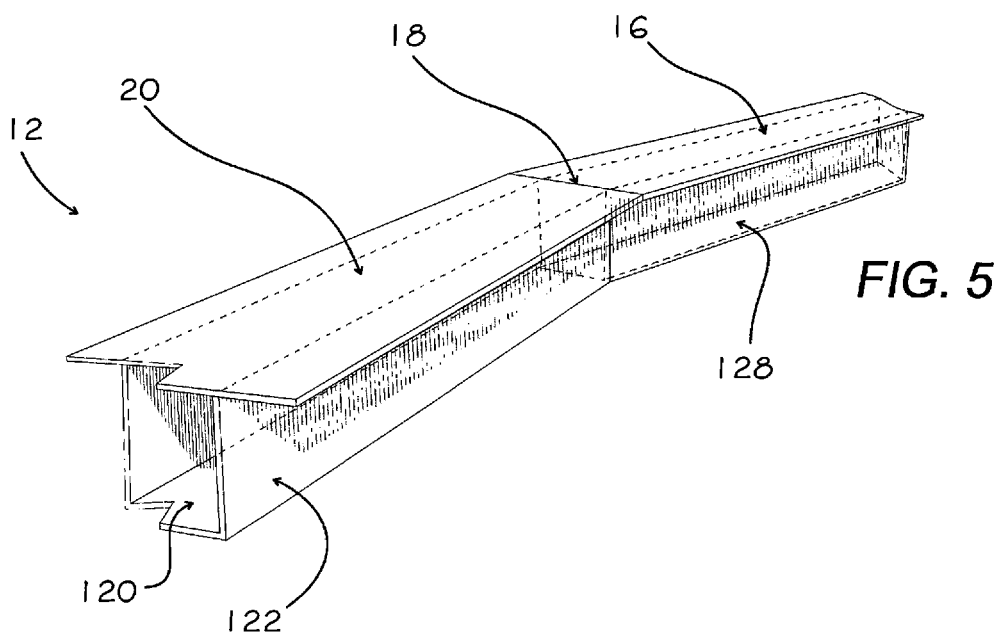
FIG. 5

COMPOSITE BOAT TRAILER

CROSS REFERENCE TO RELATED APPLICATIONS

In accordance with 37 C.F.R. § 1.76, a claim of priority is included in an Application Data Sheet filed concurrently herewith. Accordingly, the present invention claims priority to U.S. Provisional Patent Application No. 62/880,952, entitled "COMPOSITE BOAT TRAILER", filed Jul. 31, 2019. The contents of which the above referenced application is incorporated herein by reference.

FEDERALLY SPONSORED RESEARCH OR DEVELOPMENT

Not Applicable

FIELD OF THE INVENTION

This invention is related to the field of trailers pulled behind a motor vehicle and in particular, to a composite boat trailer.

BACKGROUND OF THE INVENTION

Boat trailers are subject to the U.S. Department of Transportation regulations for strength and safety. Typically a boat trailer consists of side beams coupled together by use of cross members to form a primary structural support. The side beams come together at the front of the trailer wherein a trailer hitch is positioned for coupling the trailer to a towing vehicle. The side beams include cradle members to support a boat and a suspension system comprising wheels, brakes and lights. Since a trailer must be partially submerged for retrieving or launching a boat, any metal is susceptible to rusting or corrosion. This is especially problematic when the trailer is used in a salt water environment. During the trailering process, a loaded boat trailer is subject to large forces while moving at highway speeds. The highway speeds amplify bending, compression, torsion and tensile forces. The primary structural support must be able to handle all such forces for years.

Early trailers typically employed a painted steel structure for the primary structural support. When used in saltwater, imperfections in the paint would quickly lead to rusting. The more rust attributable to loss of paint, the quicker the structural integrity of the underlying support would be compromised. Painted surfaces gave way to anodized and, more importantly, galvanized steel. However, galvanized steel can quickly develop surface corrosion along weld points and as the coating cracks with age. High strength corrosion-resistant aluminum alloys are now used for many high end boats. Aluminum trailers are either welded or bolted together. Aluminum structural members are more expensive than galvanized steel members, but maintain their appearance longer. Further, aluminum structural members of the trailer can be extruded to form different structural shapes that can be formed into various angles. While aluminum does not rust, aluminum does corrode and usually does so quickly where fasteners are employed. This includes areas where the aluminum has been drilled for receipt of steel fasteners, weld portions, or where the aluminum is clamped together. Bunks that hold the boat over the structural members are formed from wood, which is susceptible to wood rot.

A problem with all known prior art steel and aluminum trailers is that rust or corrosion can quickly cause a trailer to deteriorate both in looks, strength and value. While aluminum trailers may maintain a better appearance than steel trailers for a period of time, the corrosion of aluminum is inevitable when used for launching boats in saltwater. The cost of a high end 35 foot boat may be over $500,000; and, if trailered, it is only a matter of time before the steel or aluminum trailer needs to be replaced due to rust or corrosion. Essentially, boats that cost hundreds of thousands of dollars sit on trailers that have not changed in 50 years. All known trailers rust, corrode and rot much sooner than the boats that they carry. The average trailer life is less than ten years, and major repairs are typically required within the first five years just to keep the trailer operational. The use of plastic fenders is known, but typically look like aftermarket components when the primary frame members are of a dissimilar material.

What is lacking in the art is a trailer constructed especially for use in saltwater, wherein rusting and corrosion is eliminated in primary support areas.

DESCRIPTION OF RELATED ART

U.S. Pat. No. 7,828,329 discloses a transport frame formed from a plurality of polymer beams that interconnected to form a frame. The polymer frame member is held together with adhesive.

U.S. Pat. No. No. 7,690,161 discloses a structural member for a vehicle having a slot extending into one structural wall thereof for receiving a bolt, wherein the structural member includes the slot formed by extrusion. The slot extends the length of the structural member for slidably receiving the head of one or more bolts, wherein the land area of each bolt head extends beyond the slot opening to overlay the wall area carrying the slot.

SUMMARY OF THE INVENTION

Disclosed is a boat trailer specifically designed for use in salt water having beams, bolts, hangers, fenders, guide poles, suspension, and bunks formed from composite materials that cannot rust or corrode. The boat trailer employs a manufacturing technique that reinforces all beams to distribute forces anticipated during the movement of a boat on the trailer at highway speeds.

An objective of the instant invention is to provide a composite trailer that will last as long as the boat it is designed to carry and will not degrade from use in saltwater.

Another objective of the instant invention is to provide a composite trailer constructed from an infusion technology that draws plastic resin into fabrics, such as carbon fiber and fiberglass, under a vacuum bag.

Another objective of the instant invention is to provide a composite trailer wherein beams, bolts, hangers, fenders, guide poles, and bunks are formed from composite materials that cannot rust or corrode.

Yet still another objective of the instant invention is to provide a composite trailer having wheels formed from composite materials which are coupled to use run flat or airless tires.

Still another objective of the instant invention is to provide a composite trailer having any metal parts, such as axles and brakes, formed from a high quality stainless steel such as AQUAMET.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE DRAWINGS

FIG. 4 is an exploded view of a composite beam angle transition section;
FIG. 5 is a plane view of the beam angle transition section.

DETAILED DESCRIPTION OF THE PREFERRED EMBODIMENT

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
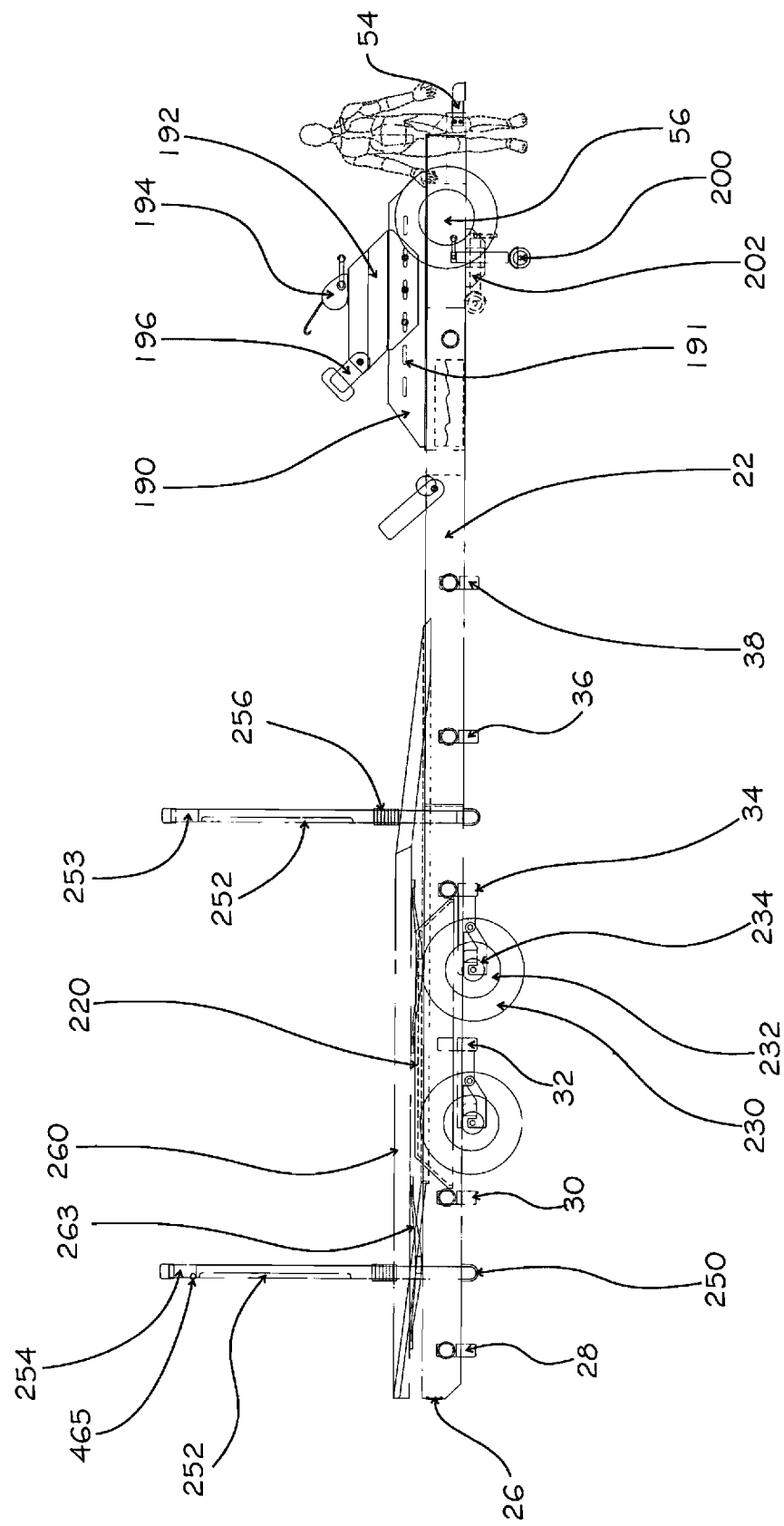
FIG. 1 is a side view of a composite boat trailer.
Figure 2:
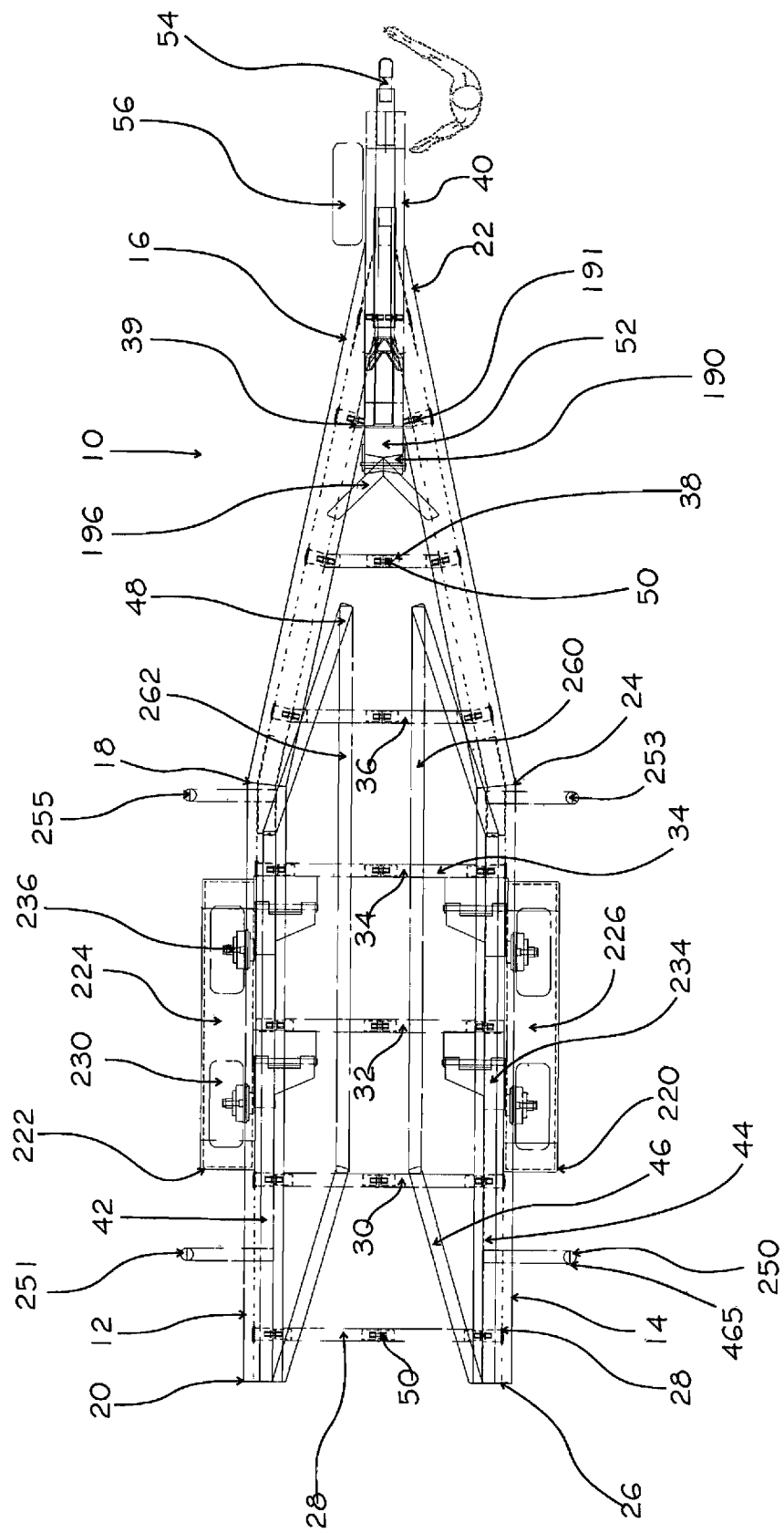
FIG. 2 is a top view of the composite boat trailer.
Figure 3:
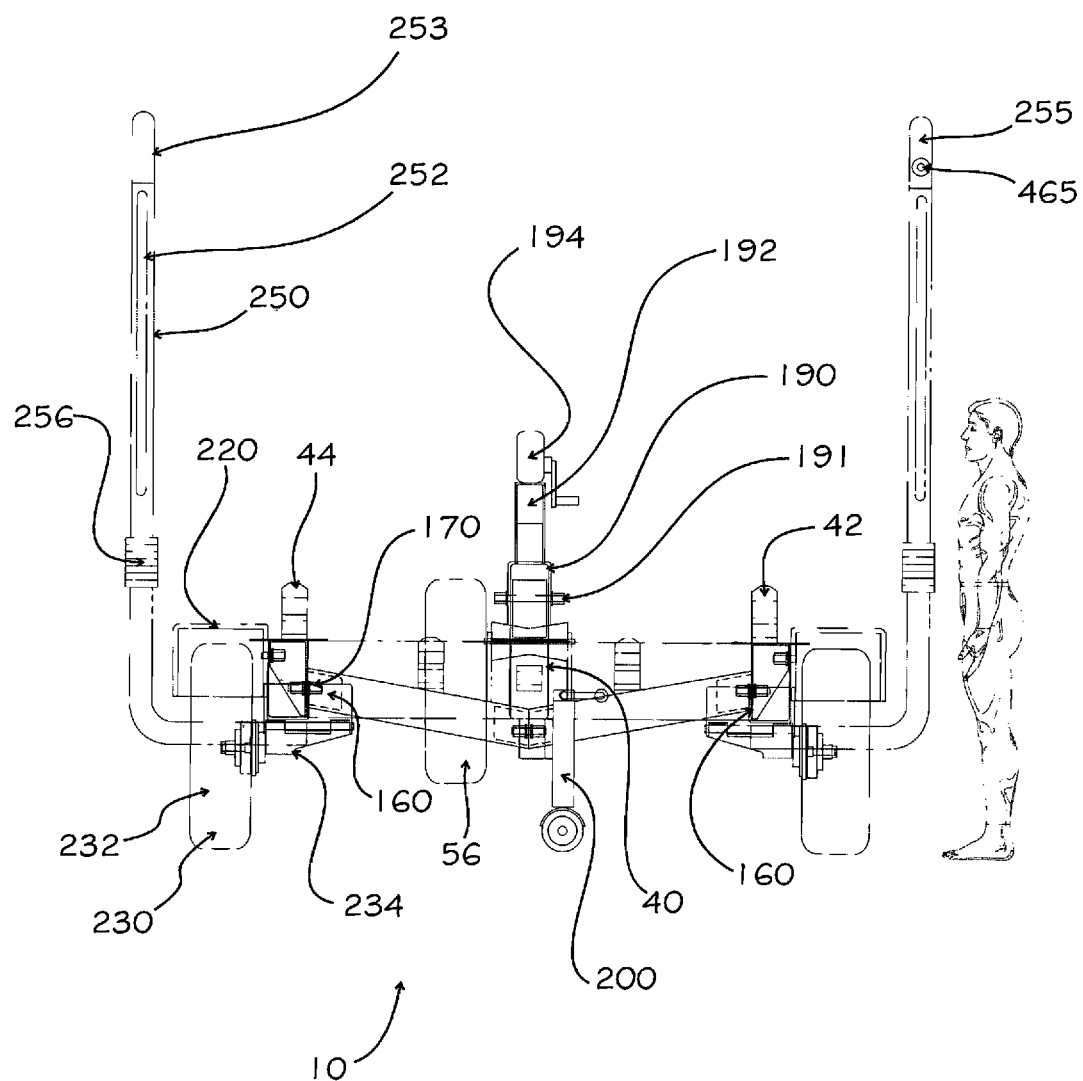
FIG. 3 is a front end view of the composite boat trailer.

Referring to FIGS. 1-3, illustrated is a boat trailer 10 formed from composite materials. The boat trailer 10 is formed from a first beam 12 spaced apart from a second beam 14. The beams are constructed from FRP (fiberglass reinforced polymer) or CRFP (carbon fiber reinforced polymer) pultruded tube. Pultrusion forms a composite tube by pulling fibers and resin through a heated die. The resulting beam is 75% lighter than steel, and 30% lighter than aluminum, for the same strength. The FRP is noncorrosive, nonconductive, easy to repair and easy to paint.

The first beam 12 is defined by a first front end 16, a transition section 18, and a first rear end 20. Similarly, the second beam 14 has a second front end 22, a transition section 24, and a second rear end 26. Between the rear ends 20, 26 and transition sections 18, 24, the first beam 12 is spaced apart from the second beam 14 by cross beams 28, 30, 32 and 34, which are formed of equal length. Between the transition sections 18, 24 and the front ends 16, 22, cross beam 36 is of a first length, cross beam 38 is of a second length, and cross beam 39 is of a third length, wherein the first and second beam 12, 14 are adjoined to a tongue beam 40 via the angled, front end beams 16 and 22.

A first main support bunk 42 is secured to an upper surface of the first beam 12, and a second main support bunk 44 is secured to an upper surface of the second beam 14. Secondary support bunks 46, 48 are positioned over the cross beams 28, 30, 32, 34, and 36, which are used to align the bottom of a boat. Rollers 50 can be attached to cross beams. The use of recycled HDPT bunks provides for a support structure that cannot rot, eliminates the need for carpet covering as the coefficient of friction for an HDPE (high density polyethylene) bunk is very low, and the support structure can be shaped to custom fit the hull of a boat.

Figure 6:
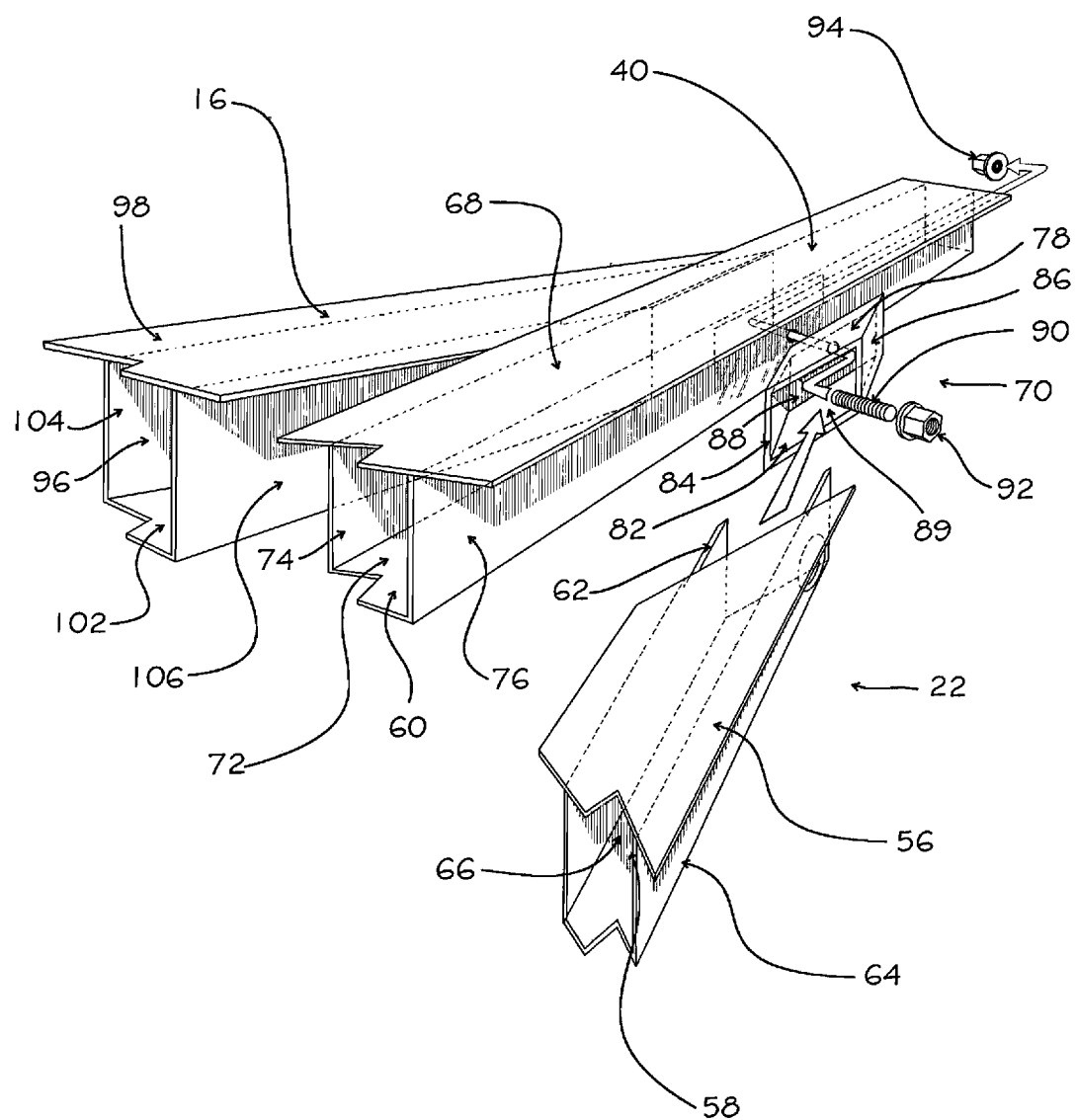
FIG. 6 is an exploded view of the diagonal beams to tongue beam attachment.

The front of the trailer includes the tongue beam 40 having a rear section 52 securable to the ends 16, 22 of the beam 12, 14. A front end 54 includes a trailer hitch D.O.T. trailer coupler. At least one spare tire 56 can be secured to the tongue 40 with the use of composite mounting brackets and composite bolts and nuts. Referring to FIG. 6, an exploded view of the tongue 40 and assembly is set forth wherein the second beam 14 is depicted having a top wall 56, bottom wall 58, inner sidewall 62 and outer sidewall 64, the walls forming a cavity 66 therebetween; the tongue 40 having a top wall 68, a bottom wall 72, a first side wall 74 and a second side wall 76, the walls forming a chamber 60 therebetween. For securing the tongue 40 to the second beam front end 22, an obtuse bracket support 70 defined by an upper wall 78, a lower wall 82, an inner wall 84, an outer wall 86, and a side wall 88 which forms an opening 89 is attached to the tongue using an adhesive and/or a threaded FRP shank 90 with FRP locking nuts 92, 94 fastened to each end of the threaded shank 90. The second support beam 22 having the cavity 66 secured to the bracket 70, the walls of the cavity 66 permanently attached to the second support beam 22 with adhesive. A second obtuse bracket support, not shown, is secured to the tongue 40 side wall 74, forming a mirror image coupling wherein the first support beam 12 front end 16 has a cavity 96 formed by a top wall 98, bottom wall 102, side wall 104, and opposing side wall 106.

The transition section 18, as illustrated in FIGS. 4 and 5, is formed along the first beam 12 having a first front end 16 and a first rear end 20. A joiner socket 100 is formed from a housing having a top surface 110, a bottom surface 112, a rear surface 114 and front surface panels 116, 117; the front surface panels 116, 117 depicting the turn angle 118 of the transition section. The joiner socket 100 is inserted along line 115 into the first rear end cavity 120 formed by side wall 122 of the first rear end 20 to an abutment edge 124. Similarly, the joiner socket 100 is inserted along line 125 into the first front end cavity 126 formed by side wall 128 of the first front end 16 to abutment edge 130. The surfaces of the joiner socket 100 are permanently attached to the surface walls of the cavities 120 and 126 using an adhesive.

Figure 7:
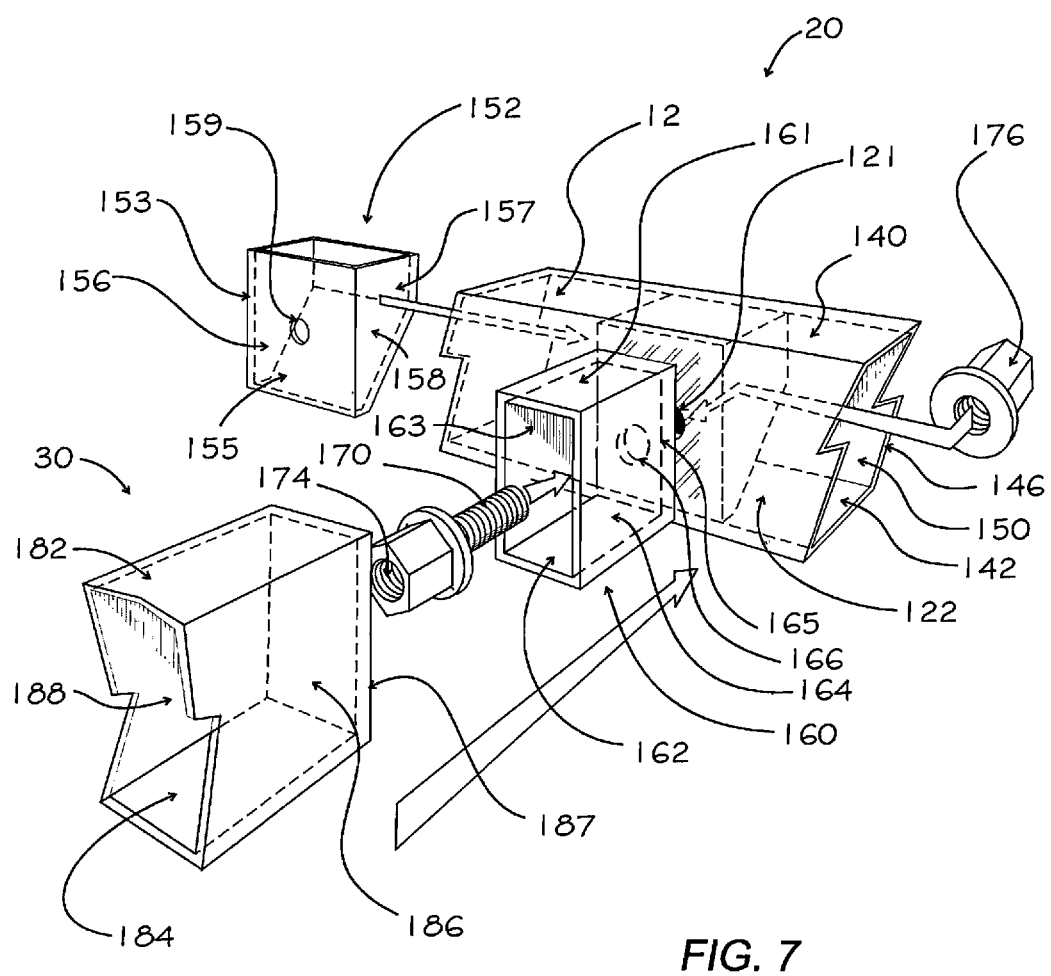
FIG. 7 is an exploded view of a composite cross beam assembly.

Referring now to FIG. 7, illustrated is the coupling of a cross beam 30 to the rear end 20 of the first beam 12; the rear end having an upper wall 140, a lower wall 142, a left wall 122 and a right wall 146 forming an inner cavity 150. A gusset 152 is defined by a lower wall 155, a front wall 156, a first and second upper vertical wall 153, 157 and a lower angular opening 158. An aperture 159 is formed in the front wall 156. The gusset 152 is slidably insertable within the inner cavity 150. A support socket 160 is defined by a top wall 161, bottom wall 162, opposing side walls 163, 164, and back wall 165 having an aperture 166 which aligns with aperture 121 formed in side wall 122 of the first rear end beam 20. The front wall 156 of the gusset 152 and the back wall 165 of the support socket 160 are bonded to the sidewall 122 with an adhesive. A threaded FRP shank 170 is insertable through the apertures 159 and 166 using a frontal nut fastener 174 and rearward nut fastener 176 which can add additional sheer strength to the joint. A cross beam 30 having an upper surface 182, a lower surface 184, and first and second side surfaces 186 and 188 is constructed and arranged to slide over the support socket 160 and frictionally engage the inner surface of the cross beam 30 and outer surface of the support socket 160 to assure the material is bonded together. The beam 12, gusset 152, support socket 160 and cross beam 30 all distribute forces evenly through the assembly, thereby eliminating the need for further reinforcement, and all components are secured together with adhesive forming a uniform structure.

The tongue 40 supports a guide rail 190 with a locking pin 191 operatively associated with adjustable housing 192 for positioning appropriate to the length of the boat. The housing receives a stainless steel D.O.T. approved winch 194 and alignment sling 196 constructed and arranged to hold the bow of a boat in a fixed/aligned position. A rotatable trailer jack 200 can be deployed for holding the tongue 40 in a position for loading or unloading from a towing vehicle, and can be rotated into a storage position 202 for transporting.

The fenders 220 and 222 are CFRP. As the fenders and beams are constructed from the same composite material, the fenders can be color coated to match the beams, providing an ascetically pleasing trailer. The fenders 220, 222 each include built-in steps 224, 226 that can handle in excess of 400 lbs. The tires 230 are run flat or high grade tires; airless tires 230 are preferred. Similarly, CFRP rims 232 can be used to eliminate corrosion, although aluminum rims and conventional tires can be used, as they are stocked universally as replacement items throughout boating countries. In the preferred embodiment, the use of a 7000 lb. TIMBREN Axle-Less composite suspension 234 for each wheel eliminates the need for a cross axle and leaf springs. Stainless steel brakes 236 limit corrosion issues to consumable items.

Guide bars 250, 251, 253, 255 include LED lighting 252 formed therein to provide night lighting, brake lights and backup lights 254. A backup camera 465 provides improved safety during the boat launch and recovery procedure. A flex base 256 provides boat alignment during the loading process to assure the boat does not extend over the fenders, yet will move so as not to mar the boat. Center bunks 260 and 262 provide boat support in addition to the main bunks. CFRP or FRP leaf springs 263 may be used to create additional cushioning for the ride of boats on the bunks.

Figure 8:
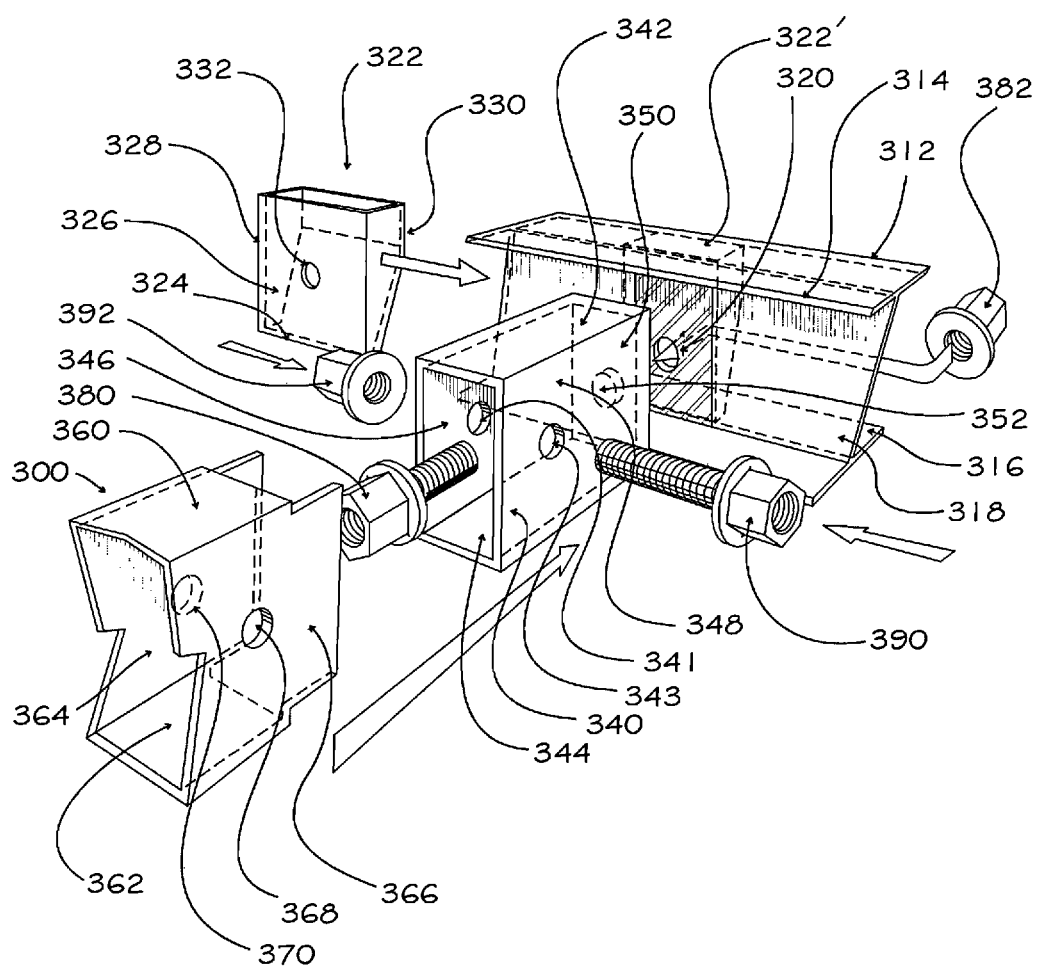
FIG. 8 is an exploded view of an I-beam side coupling.

Referring now to FIG. 8, illustrated is an alternative embodiment for the coupling of a cross beam 300 to an I-beam 312. The I-beam is defined by an upper plate 314 spaced apart from a lower plate 316 by a center wall 318; the center wall having an aperture 320 at the coupling position. A gusset 322 is defined by a lower wall 324, a front wall 326, a first and second upper vertical wall 328, 330 with an aperture 332 formed in the front wall 326. The gusset 322' is positioned on one side of the central wall 318 between the upper plate 314 and the lower plate 316. A support socket 340 is defined by a top wall 342, bottom wall 344, opposing side walls 346, 348 and back wall 350 having an aperture 352 which aligns with aperture 320 formed in center wall 318 of the I-beam 312 and aperture 332 in gusset 322. The back wall 350 of the gusset 322 and the center wall 318 are bonded together with an adhesive. The cross beam 300, having an upper surface 360, a lower surface 362, first and second side surfaces 364 and 366 are constructed and arranged to slide over the support socket 340. Apertures 368 and 370 are formed in the first and second side surfaces 364 and 366 along with apertures 341 and 343 of the support socket 340. Fastener 380, comprising a drive head and threaded shank, is positioned through apertures 352 and 320 to accompany the adhesive attachment of the support socket 340 to the I-beam 312 with attachment nut 382. Fastener 390 may accompany the adhesive attachment of the cross beam 300 to the support socket 340 by placement through apertures 368, 370, 341 and 343 and fastened thereto with attachment nut 392. The assembly distributes forces evenly, thereby eliminating the need for further reinforcement; all components are secured together with adhesive, forming a uniform structure.

Figure 9:
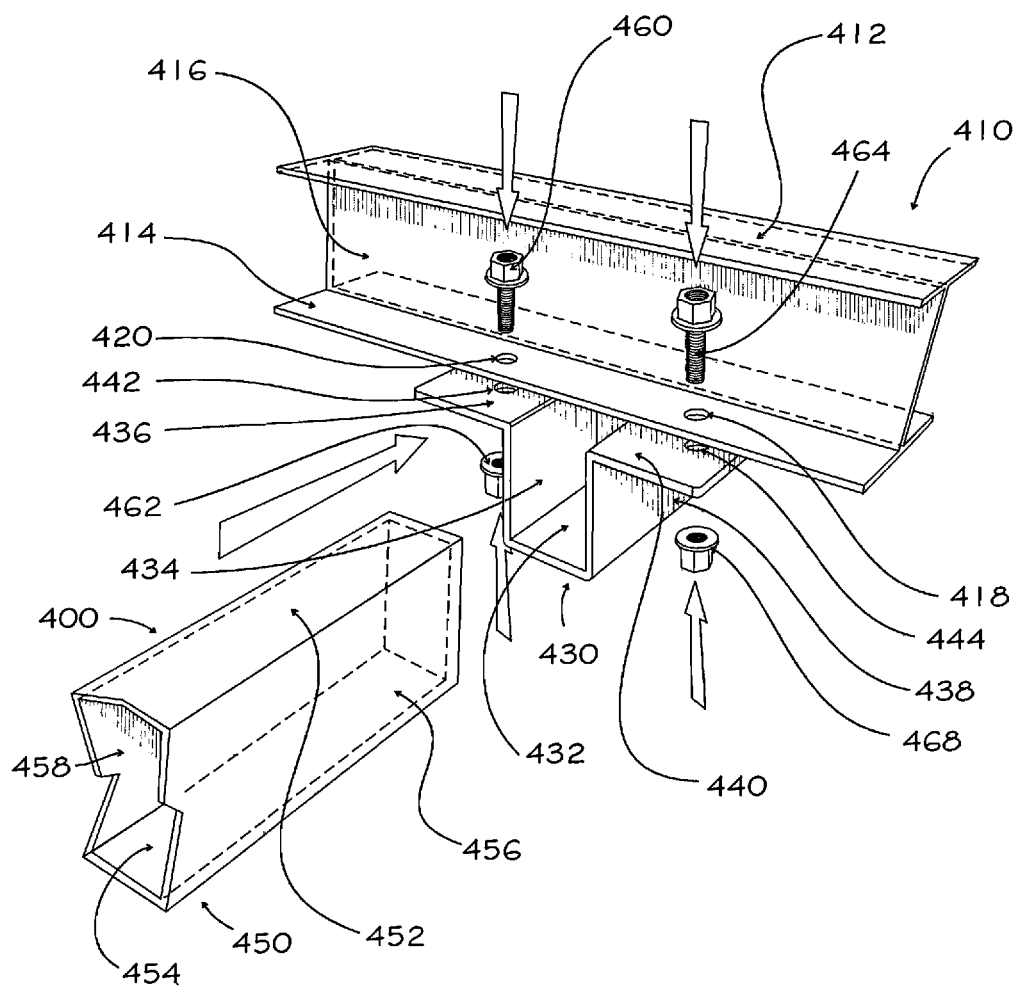
FIG. 9 is an exploded view of an I-beam bottom coupling.

Referring now to FIG. 9, illustrated is an alternative embodiment for the coupling of a cross beam 400 to an I-beam 410. The I-beam 410 is defined by an upper plate 412 spaced apart from a lower plate 414 by a center wall 416; the center lower plate 414 having first and second apertures 418, 420 at the coupling position. A support socket 430 is defined by a bottom wall 432, a first side wall 434 with a second flange top 440; the first flange top wall 436 having a first mounting aperture 442 for alignment with I-beam first aperture 420, and a second mounting aperture 444 for alignment with I-beam second aperture 418. Cross beam 450, defined by top wall 452, bottom wall 454, side walls 456 and 458 is partially inserted into the support socket 430 and held in position with fastener 460. Additionally adhesive may be added to all engaged surfaces to form permanent joints. Attachment nut 462 is positioned through apertures 420 and 442, and threaded fastener 464 is positioned through apertures 418 and 444. The assembly distributes forces evenly, thereby eliminating the need for further reinforcement; all components may be secured together with adhesive, forming a uniform structure.

Figure 10:
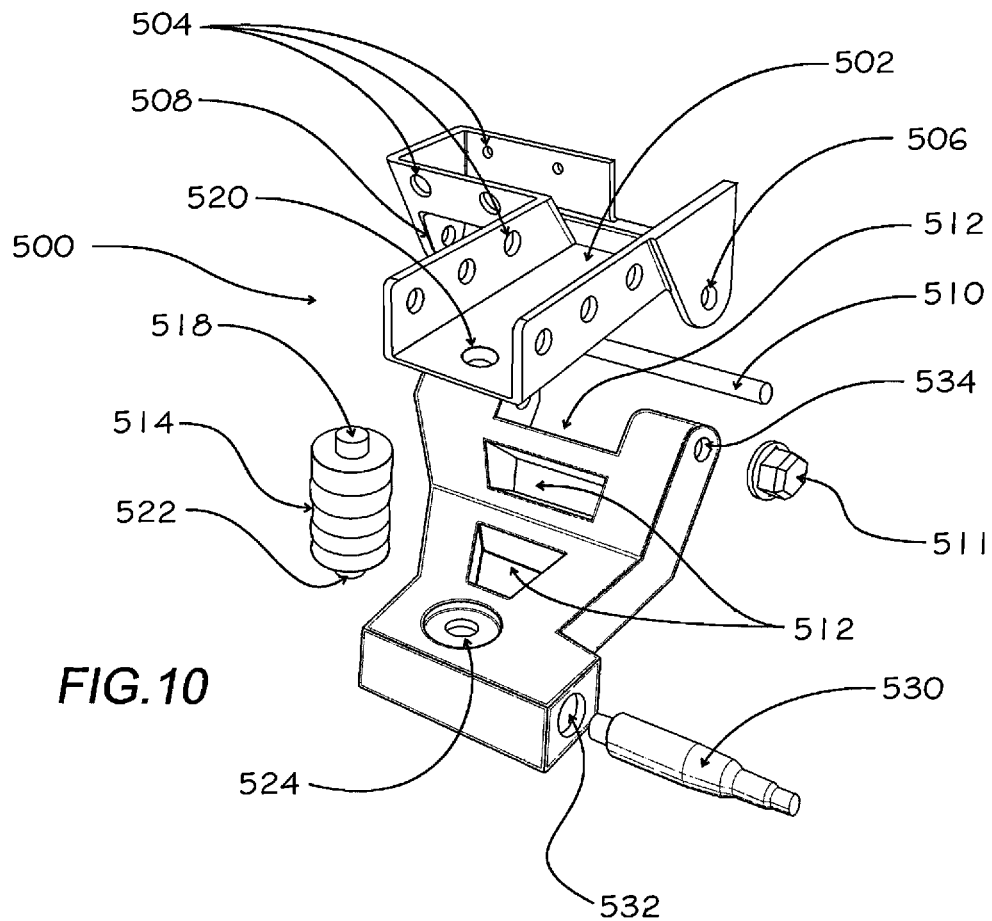
FIG. 10 is an exploded view of a composite suspension system.
Figure 11:
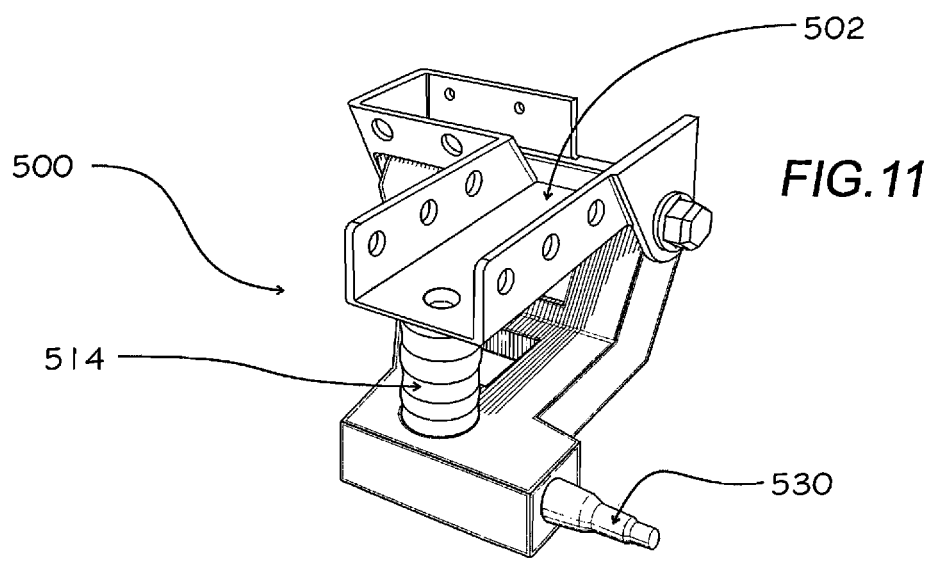
FIG. 11 is an assembled suspension system of FIG. 10.

Referring to FIGS. 10 and 11, a suspension system is attached to each beam for support of a wheel. The suspension system includes a composite attachment bracket 502 that is attached to each beam using attachment apertures 504 for receipt of FRP threaded shanks and nuts, not shown. The attachment bracket 502 has pivot brackets 506 and 508 for receipt of a pivot bar 510 and fastening cap 511, which allows pivotable coupling to a composite traveler arm 512 having a shock absorbing mechanism 514 placed therebetween. The shock absorbing mechanism 514 has an upper centering post 518 for placement in alignment aperture 520 and a lower centering post 522 for placement in lower alignment aperture 524. A conventional axle 530 fits within the axle support base 532, the axle would attach to a wheel assembly, shown in FIG. 3, including brakes, bearings, seals and fastening hub. The composite shaped traveler arm 512 includes structural formations 512 that provide reinforcement stiffeners.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

While this specification sets forth a boat trailer as a primary embodiment, it will be obvious to one skilled in the art that the trailer disclosed herein can be adapted for car haulers, ATV trailers, pool cleaner trailers, motorcycle trailers, lawnmower trailers, personal watercraft trailers, flatbed trailers, box trailers, horse trailers, tractor trailers, heavy equipment trailers, expandable trailers, dump trailers, airplane trailers, canoe trailers, livestock trailers, agricultural trailers, pop-up trailers, pickup bed campers, snow mobile trailers, RV and coach chassis/body assemblies.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The term "composite" as used in this application refers to a non-metal material. The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

What is claimed is:

1. A composite boat trailer comprising:
   a tongue beam constructed of a composite material having a D.O.T. approved trailer hitch attached to a forward end and a D.O.T. approved winch with an alignment sling attached to a rearward end;
   a first beam defined by a substantially rectangular cross section forming an interior chamber having a first front end secured to a first side of said tongue beam by use of a first bracket support, said first front end extending along an angular orientation to a first transition section for extending along a parallel orientation to said tongue beam to first rear end, said first transition section housing a first joiner socket position therein; a second beam defined by a substantially rectangular cross section having a second front end secured to a second side of said tongue beam by use of a second bracket support, said second front end extending along an angular orientation to a second transition section for extending along a parallel orientation to said tongue beam to second rear end, said second transition section housing a second joiner socket positioned therein;
   a plurality of composite substantially rectangular shaped cross beams coupling said first beam to said second beam;
   a suspension attached to each said first beam and said second beam, said suspension including a composite attachment bracket pivotedly coupled to a composite traveler arm having a shock absorbing mechanism placed therebetween, said traveler arm including an axle for attachment of a conventional wheel thereto.

2. The composite boat trailer according to claim 1 wherein said composite material is fiberglass reinforced polymer.

3. The composite boat trailer according to claim 1 wherein said composite material is carbon fiber reinforced polymer.

4. The composite boat trailer according to claim 1 wherein said cross beams are coupled to said first beam and said second beam by use of a support block placed within each end of said cross beam for coupling to a gusset placed with each cavity of said first and second beams, said support block secured to each said beam and each said support block secured to each said gusset by a threaded FRP shank securable to an FRP nut placed within each gusset.

5. The composite boat trailer according to claim 4 including a threaded FRP shank and nut for securing each said cross beam to each said support block.

6. The composite boat trailer according to claim 1 wherein each said bracket support is secured to said tongue beam by adhesive.

7. The composite boat trailer according to claim 6 wherein said bracket support is further supported to said tongue beam using a threaded FRP shape with FRP locking nuts.

8. The composite boat trailer according to claim 1 wherein said traveler arm includes structural formations that provide reinforcement stiffeners.

9. A composite boat trailer comprising:
   a tongue beam constructed of a composite material having a D.O.T. approved trailer hitch attached to a forward end and a D.O.T. approved winch with an alignment sling attached to a rearward end;
   a first beam defined by a substantially rectangular cross section forming an interior chamber having a first front end secured to a first side of said tongue beam by use of a first bracket support, said first front end extending along an angular orientation to a first transition section for extending along a parallel orientation to said tongue beam to first rear end, said first transition section housing a first joiner socket position therein; a second beam defined by a substantially rectangular cross section having a second front end secured to a second side of said tongue beam by use of a second bracket support, said second front end extending along an angular orientation to a second transition section for extending along a parallel orientation to said tongue beam to second rear end, said second transition section housing a second joiner socket positioned therein;
   a plurality of composite substantially rectangular shaped cross beams coupling said first beam to said second beam, said cross beams are coupled to said first beam and said second beam by use of a support block placed within each end of said cross beam for coupling to a gusset placed with each cavity of said first and second beams, said support block secured to each said beam by said support block secured to each said gusset,
   a suspension attached to each said first beam and said second beam, said suspension including a composite attachment bracket pivotedly coupled to a composite traveler arm having a shock absorbing mechanism placed therebetween, said traveler arm including an axle for attachment of a conventional wheel thereto.

10. The composite boat trailer according to claim 9 wherein said composite material is fiberglass reinforced polymer.

11. The composite boat trailer according to claim 9 wherein said composite material is carbon fiber reinforced polymer.

12. The composite boat trailer according to claim 9 wherein each said bracket support is secured to said tongue beam by adhesive.

13. The composite boat trailer according to claim 12 wherein said bracket support is further supported to said tongue beam using a threaded FRP shape with FRP locking nuts.

14. The composite boat trailer according to claim 9 wherein said traveler arm includes structural formations that provide reinforcement stiffeners.

\* \* \* \* \*